(12) United States Patent
Cadle et al.

(10) Patent No.: US 6,471,406 B1
(45) Date of Patent: Oct. 29, 2002

(54) SIDE-BOLT BEARING CAPS

(75) Inventors: Terry M. Cadle, Wauwatosa; Peter C. Butler, Colgate; Joel H. Mandel, Hartford, all of WI (US)

(73) Assignee: GKN Sinter Metals, Inc., Germantown, WI (US)

( * ) Notice: Subject to any disclaimer, the term of this patent is extended or adjusted under 35 U.S.C. 154(b) by 82 days.

(21) Appl. No.: 09/698,671

(22) Filed: Oct. 27, 2000

Related U.S. Application Data

(63) Continuation-in-part of application No. 09/527,791, filed on Mar. 17, 2000, and a continuation-in-part of application No. 09/155,781, filed as application No. PCT/US97/04050 on Mar. 12, 1997, now Pat. No. 6,086,258.
(60) Provisional application No. 60/168,245, filed on Dec. 1, 1999, provisional application No. 60/161,943, filed on Oct. 28, 1999, and provisional application No. 60/016,852, filed on May 3, 1996.

(51) Int. Cl.[7] ............................................... F16C 17/02
(52) U.S. Cl. ........................................ 384/433; 384/434
(58) Field of Search .................................. 384/433, 434, 384/429, 294, 288

(56) References Cited

U.S. PATENT DOCUMENTS

| 4,037,888 A | * | 7/1977 | Mirjanic ..................... 384/434 |
| 5,733,049 A | * | 3/1998 | Shimmell .................... 384/434 |
| 5,775,817 A | * | 7/1998 | Gottemoller et al. ....... 384/434 |

OTHER PUBLICATIONS

Bow-tie or Splayed Cast Iron Main Bearing Cap, Admitted Prior Art. (No date).

* cited by examiner

*Primary Examiner*—Lenard A. Footland
(74) *Attorney, Agent, or Firm*—Quarles & Brady LLP

(57) ABSTRACT

A powder metal main bearing cap has integral dowels at its adjoining face around bolt holes and tooth projections surrounding the dowels. The dowels are force fit into counterbores in the engine block and the teeth bite into the metal of the block around the bolt holes to inhibit fretting wear. Elongated bolt holes can be formed in the main bearing cap to accommodate a splayed joint, with the bolt head supporting face of the cap at an oblique angle to the hole. The bearing cap can be first pressed into the engine block so as to assure indentation by the teeth and insertion of the dowels, followed by bolting.

6 Claims, 7 Drawing Sheets

SIDE-BOLT BEARING CAPS

CROSS-REFERENCE TO RELATED APPLICATION

This application claims the benefit of U.S. Provisional Patent Application No. 60/161,943 filed Oct. 28, 1999 and is a continuation in part of U.S. patent application Ser. No. 09/527,791 filed Mar. 17, 2000 which claims the benefit of U.S. Provisional Patent Application No. 60/168,245 filed Dec. 1, 1999 and is a continuation in part of U.S. patent application Ser. No. 09/155,781 filed Oct. 2, 1998 which issued as U.S. Pat. No. 6,086,258 and is the U.S. national phase of International Application No. PCT/US97/04050 filed Mar. 12,1997, which claims the benefit of U.S. Provisional Patent Application No. 60/016,852 filed May 3, 1996.

STATEMENT CONCERNING FEDERALLY SPONSORED RESEARCH OR DEVELOPMENT

Not applicable.

FIELD OF THE INVENTION

This invention relates to bearing caps, and in particular to main bearing caps for the crankshaft of an internal combustion engine.

BACKGROUND OF THE INVENTION

The introduction of main bearing caps made by powder metallurgy (P/M) into American automobiles has resulted in substantial economies for the industry. Substantial cost savings arise from the reduction in metal removal operations (broaching, milling, drilling and sawing) that were needed in the previously used cast iron castings. This is because the P/M process produces a much more precise form than is possible by the casting process. The capital cost associated with a machining line for iron castings has historically been in the 5 to 10 million dollar range, depending upon complexity and production output required. By contrast, the cost of a line to machine a comparable P/M pre-form has been in the range of 1 to 2 million dollars.

In an ongoing effort to further reduce the investment costs of manufacturing main bearing caps, research and development programs have been dedicated toward elimination of the 1 to 2 million dollars per engine program that is still needed for machining the P/M main bearing caps. One successful program resulted in the "integral dowel" which is taught in International Patent Publication No. WO 97/42424 (International Application No. PCT/US97/04050 filed Mar. 12, 1997; U.S. Pat. No. 6,086,258 issued Jul. 11, 2000), the disclosure of which is hereby incorporated by reference. This feature eliminates two or three milling operations which may approximately halve the investment needed, leaving drilling and tapping of side-bolt 8 holes as the major remaining machining process (see FIG. 1).

It is not possible with conventional or known P/M technology to compact a horizontal threaded hole since such a hole is at right angles to the direction of powder compaction and the tool element producing this feature would prevent the compact from being removed from the die cavity. Many efforts have failed in attempts to form horizontal threaded holes of the precision required by main bearing caps. Therefore, an alternative solution was sought and discovered by the inventors and is the basis for this patent application.

The need for the side-bolts (FIG. 1) is associated with the customer preference for a "quiet" vehicle when in the driver/passenger compartment. One significant contributor to unpleasant noise (termed noise, vibration and harshness, or NVH, in the automotive industry) is the transmission of vibrations which emanate from the engine crankshaft. The high speed revolution and the vibrational stresses it transmits to the main bearings and the main bearing caps, which support and retain them, is a particularly persistent source of NVH. A design solution that was made popular in the last 4 to 5 years is to stiffen the support of the crankshaft by bolting the main bearing caps to the side of the cylinder block, thereby forming a stiff cage or box structure. This has shown significant reductions in NVH perception in a number of vehicles.

The downside of this solution is two-fold. Firstly, the cost of the side drilling and tapping of the P/M bearing cap and the side drilling of the engine block adds to vehicle cost. Secondly, the side holes through the engine block are potential oil leak paths which require special bolts, some with a gasket material incorporated to ensure a leak-free engine.

The concept of vertical side-bolts or inclined angle side-bolts is not new, however, the technology to date has had several drawbacks when applied to a cast iron main bearing cap. Firstly, the holes still have to be drilled in the casting and the rough cast surface has to be machined to provide a flat face for the bolt-head to bear against. Secondly, the "underarm" adjoining face 14 (see FIG. 4A, which shows two holes through the foot-one, two or more may be provided) has to be precisely machined to match the height differential between the joint face 16 and the arm support face 32 of the cylinder block to avoid leaving an excessive gap (g). This degree of sophistication has prevented the adoption of the vertical or inclined side-bolts in mass production.

A third drawback is that a flat-faced bolted joint is not rigid in the plane 3 of the joint face (See FIG. 5A). That means that there can be a sliding action between the bolted faces. This sliding action can be a very small length and can be cyclic, in time with the rotational speed of the engine. In this case, the phenomenon is known as "fretting wear", which results in bolted surfaces wearing by a mechanism that is not fully understood according to even the most recent accounts. It involves surface oxidation, localized pitting and when severe, can lead to surface cracks and even section fracture. There are some methods available to reduce the severity of fretting wear, and the most effective appears to be the use of a fitted dowel 5, which provides a precision location between the two surfaces and minimizes sliding vibration (FIG. 5B). Unfortunately, precision dowels are costly and require great precision in the holes that are drilled in the two mating components. This is not a cost-effective option for high volume, low cost engine manufacture. The use of integral dowels 7 in a P/M main bearing cap in the "arm" sections is an alternative solution (as taught in International Patent Publication No. WO 97/42424) (FIGS. 5C and 5D), but the problem of the height differential precision persists.

SUMMARY OF THE INVENTION

A solution to these problems is offered by this invention, which alters the direction of the bolt holes to either vertical (FIG. 2) or at an inclination (FIG. 3) such that the holes in the P/M bearing cap can be compacted instead of drilled and tapped or milled. This also avoids the need to breach the cylinder block wall, thereby eliminating any risk of oil leakage from such holes.

To deal with the "arm" height differential, and also the joint face fretting wear, a design was conceived that is only possible to produce in large volumes by powder metallurgy. This consists of an integral dowel at least partially around the bolt hole on the underarm surface of the bearing cap, with an array of fine raised pointed conical teeth at least partially around the dowel that bite into the cylinder block facing surface when bolt pressure is applied. As the bolt is tightened down, the "teeth" both bite into the cylinder block material and also compress themselves. In the case of an aluminum alloy cylinder block, there is more indentation than tooth compression. In the case of a cast iron cylinder block, there is less indentation and more tooth compression. However, in both cases the teeth provide a fretting resistant bolted joint, and simultaneously provide an accommodation for the variation in height differentials on the block and on the P/M bearing cap. This is accomplished by the simple fact that a mismatch in height differentials that leaves a larger than average underarm gap is accommodated by the teeth not indenting or compressing as much as when there is a smaller than average gap.

In another aspect, a splayed or bow-tie joint can be made, with the side bolts threaded into the block at an oblique (non-perpendicular) angle by making the bolt holes elongated, with the bolt head supporting surfaces of the bearing cap arms at an oblique angle to the hole. The bolt therefore extends at an angle relative to the sides of the hole, which are straight and parallel to the sides of the bearing cap and to the main bolt holes in the bearing cap.

In a method of assembling bearing caps of the invention, the bearing caps are first pressed into position with a shaped punch that ensure positive indentation of the teeth into the material of the block and insertion of the integral dowels into the counterbores of the block, followed by bolting the main bearing cap to the cylinder block, so as to produce more consistent bearing bores defined between the bearing cap and the block.

These and other objects and advantages of the invention will be apparent from the detailed description and drawings.

DETAILED DESCRIPTION OF THE PREFERRED EMBODIMENT

As stated in the summary, a mismatch in height differentials that leaves a larger than average underarm gap g (FIGS. 4A and 4C) is accommodated by the teeth not indenting or compressing as much as when there is a smaller than average gap. This automatic compensation was developed in the design details so that, in either extreme (which is dictated by normal practice tolerance capability), acceptable bending stresses are induced in the underarm region of the P/M main bearing cap (adjoining face 14 in FIG. 4A), and the lower corner (18 in FIG. 4A) of the cylinder block pocket. To derive this combination of stress control requires a combination of finite element analysis (FEA) and instrumented strain gage tests. The practice of both FEA and strain gage instrumented testing is well known in the art, but the combination and application of the techniques to solve this challenge is not published nor known to have been used previously.

This analysis is necessary on a case-by-case basis since the design parameters vary with each engine block design, however, the principle is the same and is explained in the following example.

Figure 6:
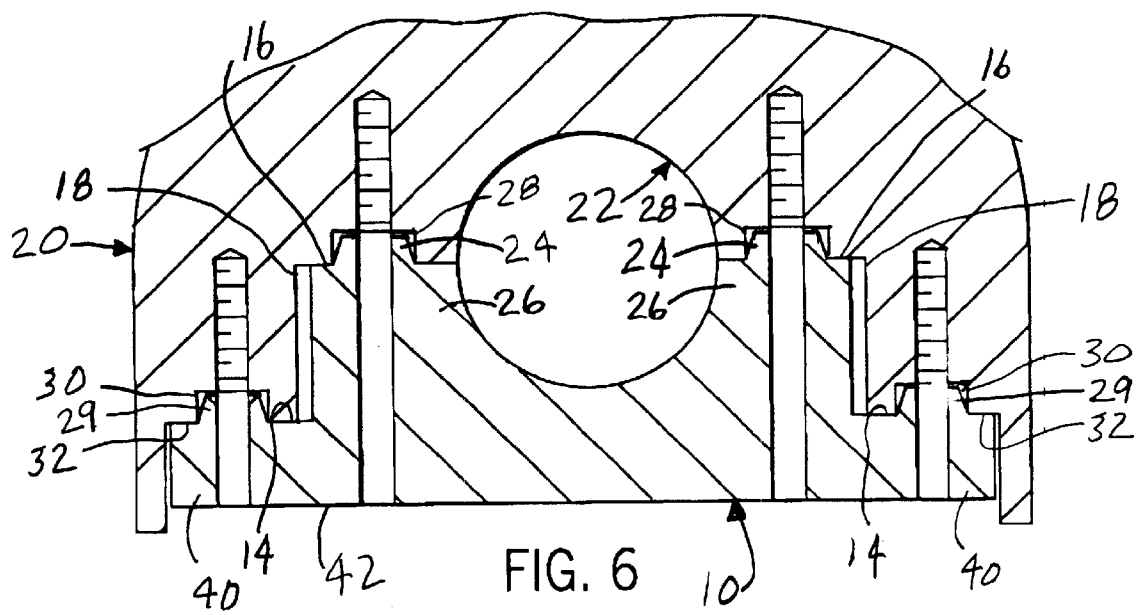
FIG. 6 is a cross-sectional view similar to FIG. 1 but of a main bearing cap incorporating the invention.
Figure 7:
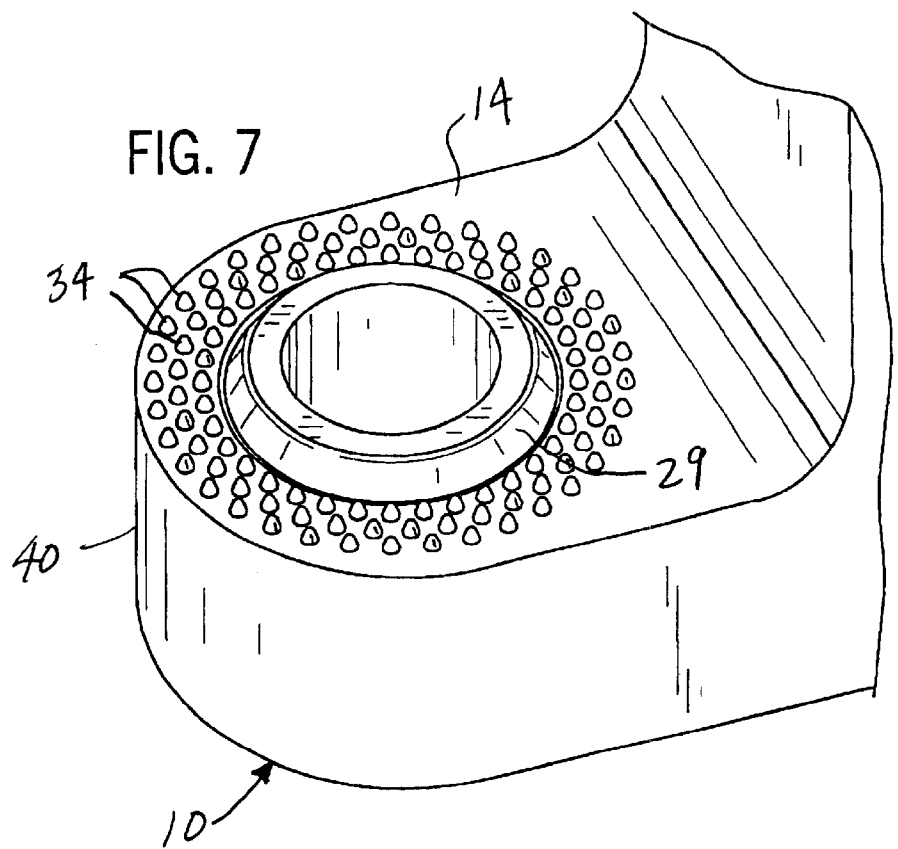
FIG. 7 is a detail view of the underarm surface of one of the arms of the bearing cap of FIG. 6.

FIG. 6 shows a typical example of a bearing cap 10 and an aluminum cylinder block 20 cross section in the crankshaft bearing bore 22 area. The P/M main bearing cap 10 features an integral dowel 24 on each "foot" 26, on each side of the main bearing bore portion. Each dowel 24 locates in a precise counterbore 28 in the cylinder block joint face as taught by International Patent Publication No. WO 97/42424. Another integral dowel 29 is featured on the underarm surface 14 of the P/M main bearing cap 10 which locates in a counterbore 30 on the shelf surface 32 of the cylinder block 20. As shown in FIG. 7, there is an array of conical raised teeth 34 on the underarm surface 14 of the P/M bearing cap 10 which surrounds the integral dowel 29.

When the P/M main bearing cap 10 (MBC 10) is installed into the cylinder block 20, it may be bolted into position or pressed into position. To simplify the explanation, the latter case is considered, though bolting in place does not alter the stresses, only the sequence of arriving at the same final stress distribution. When the MBC 10 is pressed into position, the lower integral dowel 24 initially locates the MBC 10 relative to the cylinder block 20 with the tapered conical form, and then "nests" into place in the respective counterbore as taught in International Patent Publication No. WO 97/42424. At the same time, the integral dowel 29 on the underarm of the MBC, engages in the counterbore 30 in the cylinder block shelf 32.

Figure 8:
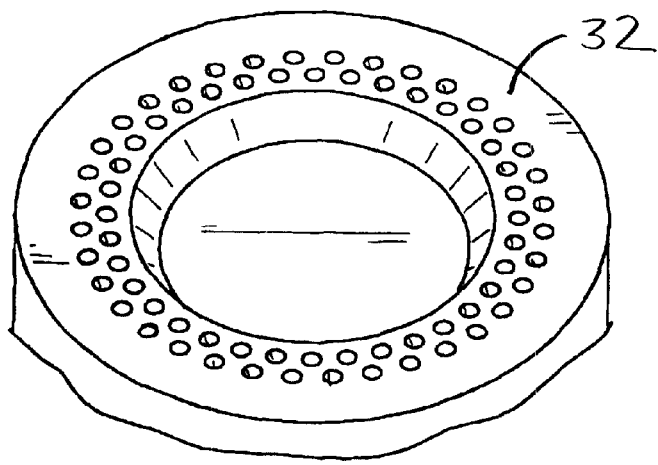
FIG. 8A is a detail view of the facing surface on the engine block which has been mated to the underarm surface of FIG. 7.
FIG. 8B is a view similar to FIG. 6 but showing the main bearing cap being pressed into position.
FIG. 8C is a view similar to FIG. 8B but showing a modified pressing punch.
Figure 9:
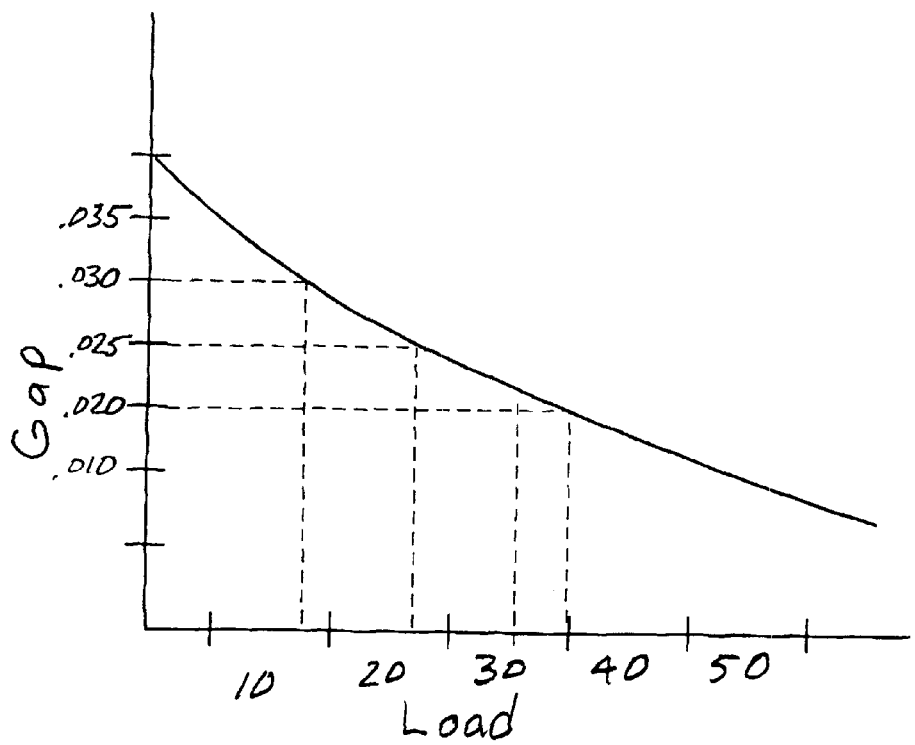
FIG. 9 is a graph showing gap versus load for pressing in a main bearing cap.
Figure 8B:
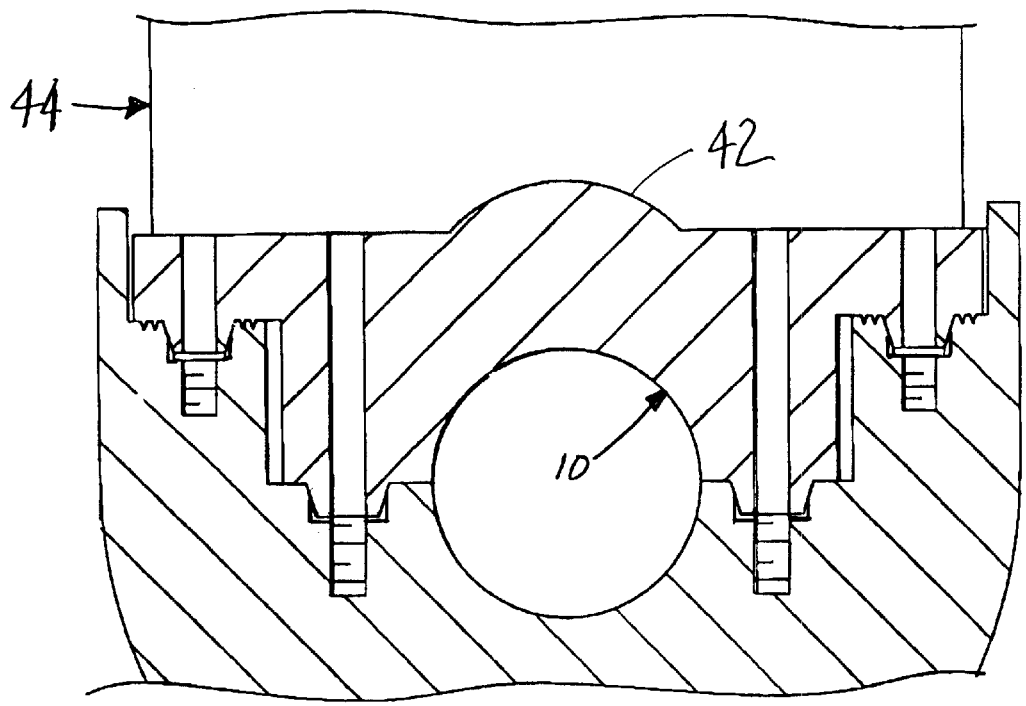
Figure 8C:
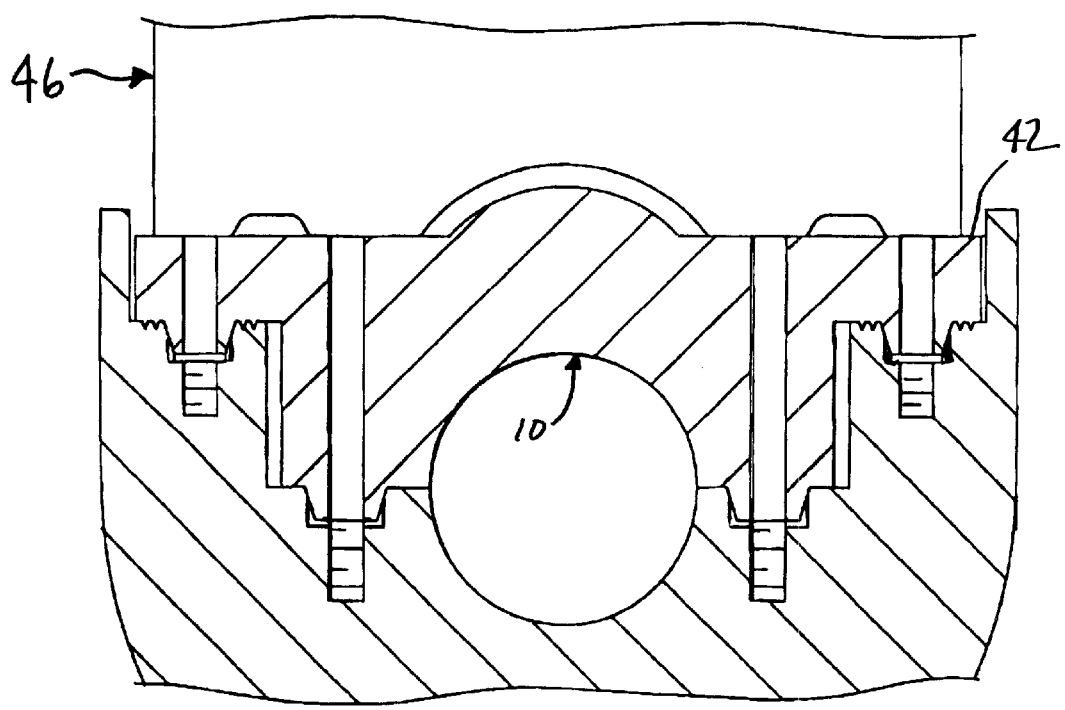

To minimize the tendency of the MBC arm 40 on which the teeth 34 are formed to bend upwards as the integral dowel 29 enters the counterbore 30 and the teeth 34 begin to indent the cylinder block material on the face 32 and undergo compression themselves, the pressing force applied to the MBC 10 may be distributed evenly over the entire surface 42 by using a matching profile on the press-in tool 44 as shown in FIG. 8B, or by using raised pads as shown in the tool 46 in FIG. 8C that press on the bolt seating faces of the main bolt holes and the side bolt holes simultaneously with cut-away relief over the rest of the face 42 profile. The total load applied is controlled to approximate the sum of the loads of all the bolts plus an allowance for the resistance of the integral dowels. This value is readily calculated or can be directly measured on a hydraulic compression test machine with a prototype setup. This load is only used as an approximation to control the press-in stroke. The reason for this is that the press-in load can be monitored and arrested when it suddenly exceeds the expected range, when the MBC feet fully contact the block joint face and increase the resistance, thereby altering the slope of the press-in stroke and load curve, signaling the hydraulic load to be arrested and the punch withdrawn. FIG. 9 shows this curve schematically, with the gap in inches vs. load.

Figure 4A:
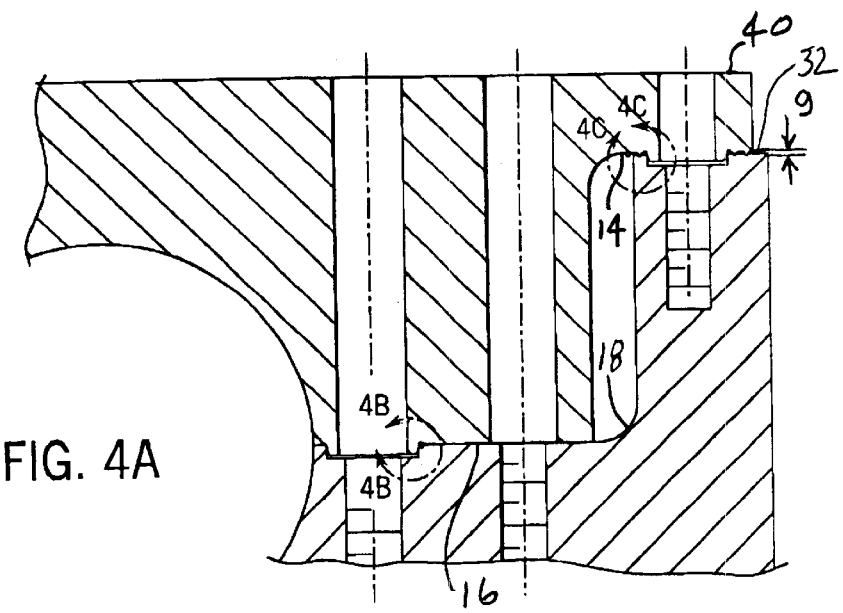
FIG. 4A is a cross-sectional view illustrating a main bearing cap incorporating the invention.
Figure 4B:
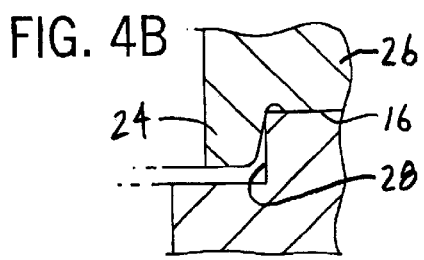
FIG. 4B is a detail view of area 4B—4B of FIG. 4A.
Figure 4C:
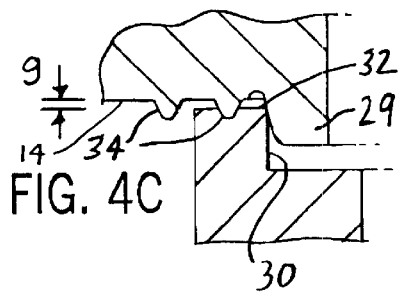
FIG. 4C is a detail view of area 4C—4C of FIG. 4A.
Figure 5A:
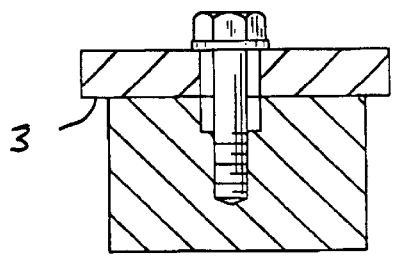
FIG. 5A is a cross-sectional view of a prior art main bearing cap bolted joint.
Figure 5B:
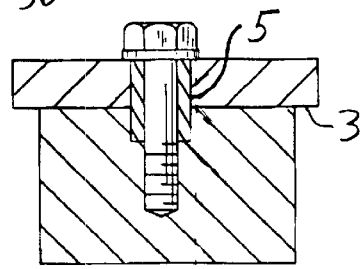
FIG. 5B is a view similar to FIG. 5A, but with a prior art fitted dowel installed.
Figure 5C:
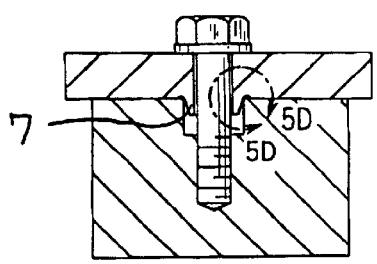
FIG. 5C is a view similar to FIG. 5B of a main bearing cap bolted joint including an integral dowel construction.
Figure 5D:
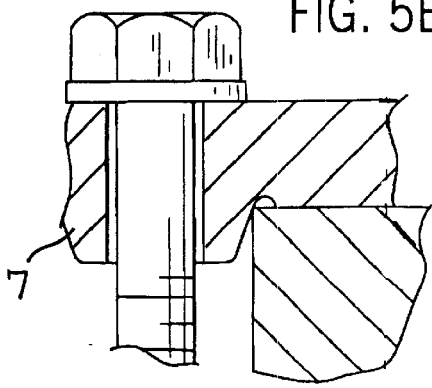
FIG. 5D is a detail view of the joint of FIG. 5C.

By a combination of FEA and strain gage instrumentation on a model, the height of the block shelf 32 to joint face 14 is chosen to give a mean clearance of g, as shown in FIG. 4A. At this clearance level, there has been full insertion of the main bolt integral dowels 24, 29 such that the feet joint face surfaces 16 are in full contact, as shown in detail in FIG. 4B. As shown, there may be a gap between the bottom of the dowels 24, 29 and the bottom of the respective counterbores 28, 30. The shelf face joint integral dowel 29 is partially engaged and the conical teeth 34 are partially indented and partially compressed, as shown in detail in FIG. 4B.

Figure 2:
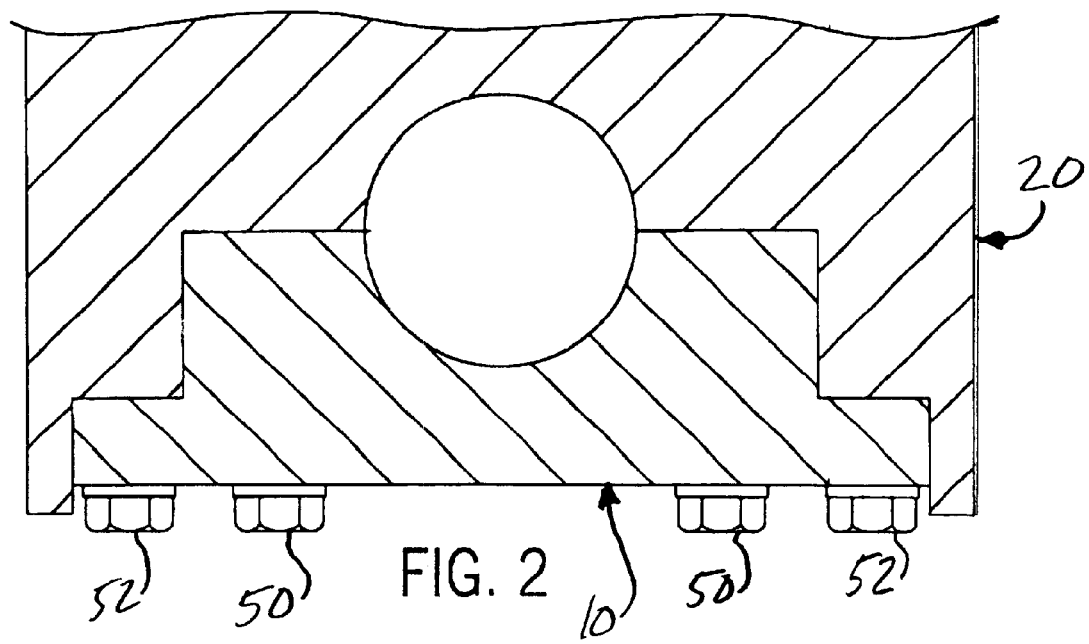
FIG. 2 is a view similar to FIG. 1 but of a main bearing cap incorporating an aspect of the invention.
Figure 3:
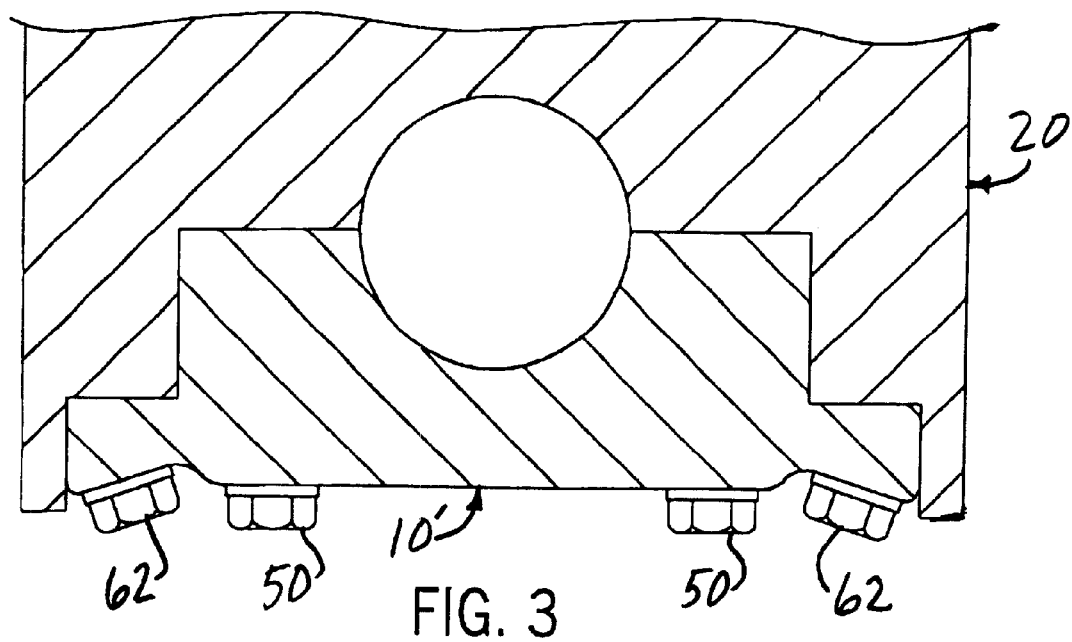
FIG. 3 is a view similar to FIG. 2 but showing an alternate embodiment of the invention.

Next, the main bolts 50 and the vertical side bolts 52 (FIG. 2) are tightened down to the respective specified torque levels, which usually approach the yield stress of the bolts used. This action causes the height of the MBC 10 to reduce under the compressive force of the bolts. Values have been measured in the region of 0.005 inches (0.125 mm). At the same time, the vertical side bolts 52 apply a compressive force to the cantilevered arms 40 of the MBC, so this section has two downward forces acting upon it, the whole body compression from the main bolts 50 plus the local compression from the vertical side bolts 52. Since the press-in load initially was at the same level as the sum of the bolted-in loads, the teeth indentations and compressions have already occurred, so the teeth simply re-engage their indentations. This re-engagement is possible because of the precise relocation of the two surfaces by means of the integral dowels 29. Without the combination of the integral dowels 29 and teeth 34, the teeth 34 could bear down on nearby indented, or partially indented, block material. This "shift" in position is undesirable when the crankshaft is fitted and the MBCs 10 are reinstalled after precision line boring since the new position may misalign the bearing surface, leading, if severe, to a rejected engine for "tight bore" or excessive noise.

Thus, the principle adopted is to ensure that the original press-in action causes the MBC 10 to seat into its final bolted position, and upon reinstallation, the integral dowels 29 and the teeth 34 simply nest into their previous positions. To accommodate variation in manufacturing tolerances of the MBC and block differential heights, these values must be known. Investigations and direct tolerance capabilities indicate this range of discrepancy to be in the region of 0.010 inches (0.25 mm). Therefore, the indenting teeth 34 have to accommodate plus or minus half this range, of 0.005 inches (0.125 mm). From experiments using a specially made single version of the integral dowel 29 and teeth 34 array (with two rows of teeth, as opposed to three as shown in FIG. 7), it was possible to carry out indentation tests (see FIG. 8A). FIG. 8A illustrates simulated surface 32 after indentation and insertion of an integral dowel. This involved using a hydraulic compression test machine to load the test sample with it bearing against a sample of engine block material. It was then possible to record and plot the graph of pressing load versus gap reduction (which is the combination of teeth indentation and height compression). To ensure accuracy, the load was applied incrementally and removed each time prior to gap measurement. This ensured that elastic recovery was not included in the gap reduction.

The result of one such test is shown in FIG. 9. Here it can be seen that at a load corresponding to a typical bolting pattern applied to MBCs that the gap reduction was 0.010 inches (0.5 mm). Therefore, a "large" gap set up would be at 0.035 inches (0.825 mm) and a "small" gap set up at 0.025 inches (0.625 mm). In both cases, the degree of teeth indentation and compression is acceptable for joint integrity as judged by shear force testing at these extremes.

It was also evident that replacing the toothed form into its original location and orientation, and applying only hand pressure, resulted in a joint that would not only totally resist sideways movement (fretting wear) but actually had an adhesive quality since it required some force to re-separate the joint. It is well known that to achieve good NVH quality, a joint must be rigid, and it is demonstrable that a toothed indented joint is superior to a plain bolted, or even a separate doweled joint.

Figure 10A:
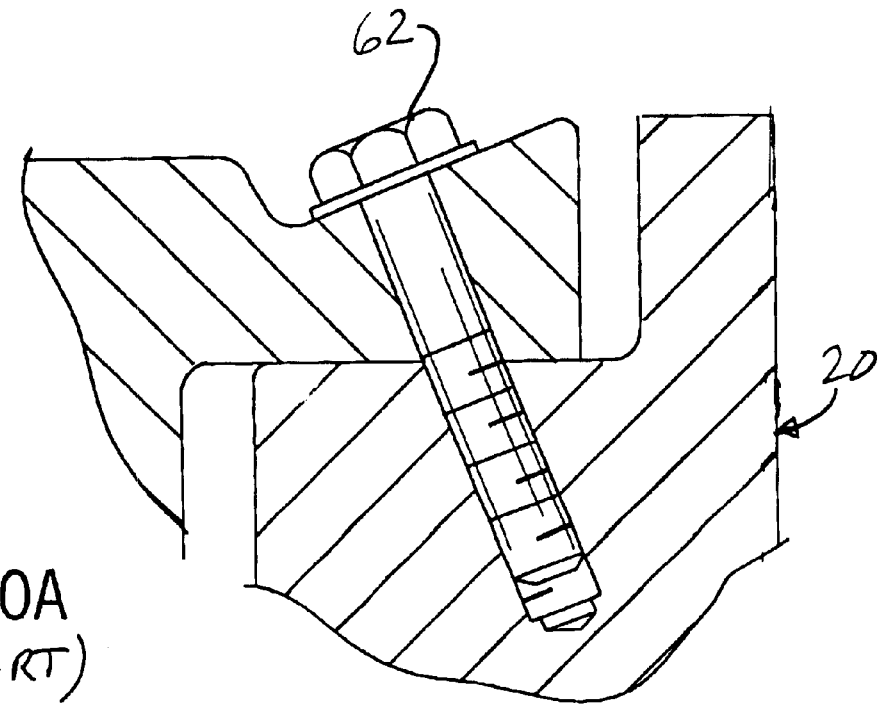
FIG. 10A is a cross-sectional view showing a prior art inclined side bolt joint.
Figure 10B:
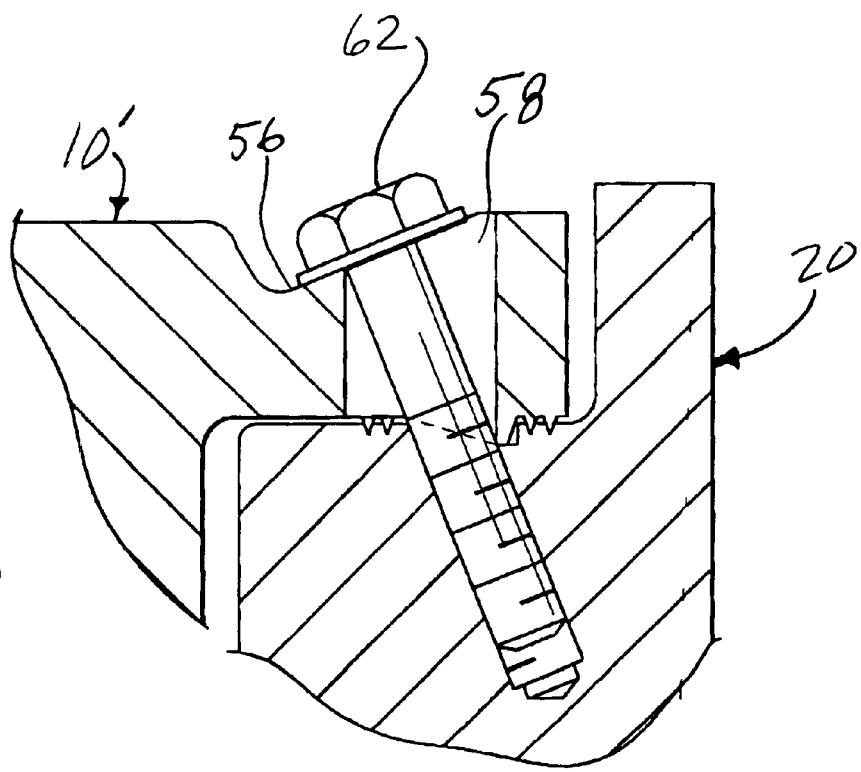
FIG. 10B is a view similar to FIG. 10A but incorporating an aspect of the invention.

In the second case of an inclined side bolt (FIG. 10A) arrangement MBC 10', also called a bow-tie joint or a splayed joint, it is clear that to mold the angled hole would be very difficult in large volume production since the forces of vertical compaction would tend to bend the core pin forming the hole, and inevitably lead to breakage, or at least cracking, of the compact. A solution to this problem was designed in the form of an elongated slot 58 that both accommodates the bolt angle and simultaneously provides a suitable angled bolt head support surface 56 for the bolts 62. This is shown in cross section in FIG. 10B. Note that this shape of slot 58 can be compacted since its sides are vertical. The different height of the "bow-tie" arm from left to right presents some challenge in compaction due to well known principles relating to powder compression ratio. However, this can be overcome by appropriate tool design and practices known to those versed in the art, such as incorporation of "splash pockets" to accommodate the excess powder in the short section.

The fretting wear risk is reduced with this design since the outwards resolved force of the bolts' action tends to "pre-stretch" the top section of the cap, thereby stabilizing the bolted joint, and tending to reduce the closure of the bore diameter under heavy engine loads.

Figure 1:
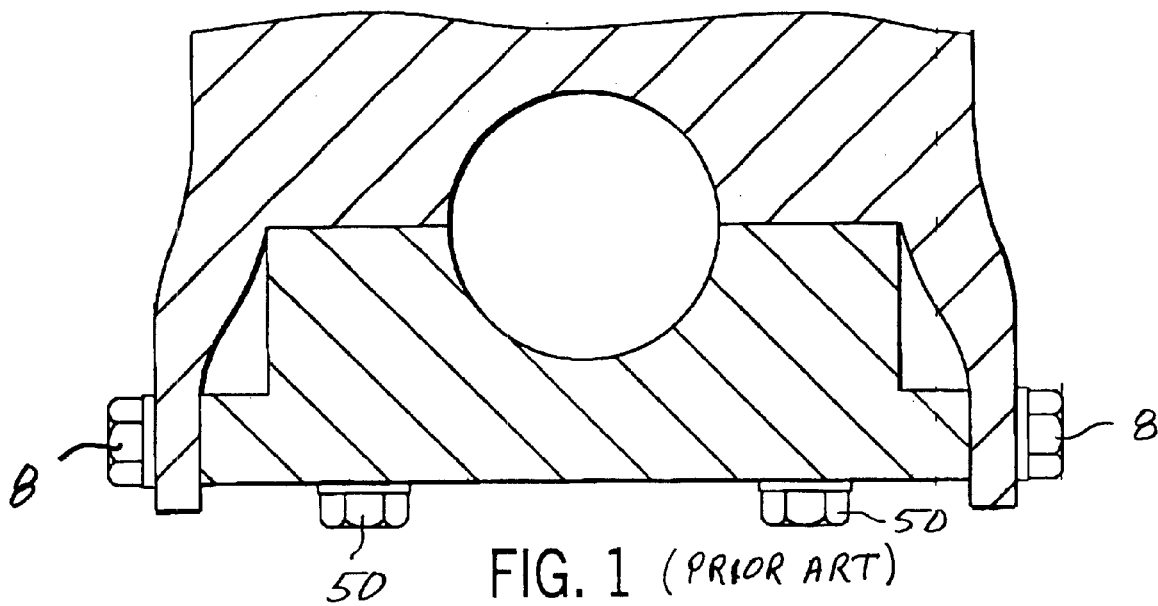
FIG. 1 is a cross-sectional view of a typical prior art main bearing cap installed to the engine block but without the crankshaft installed, as viewed in the direction of the axis of the crankshaft.
Figure 11:
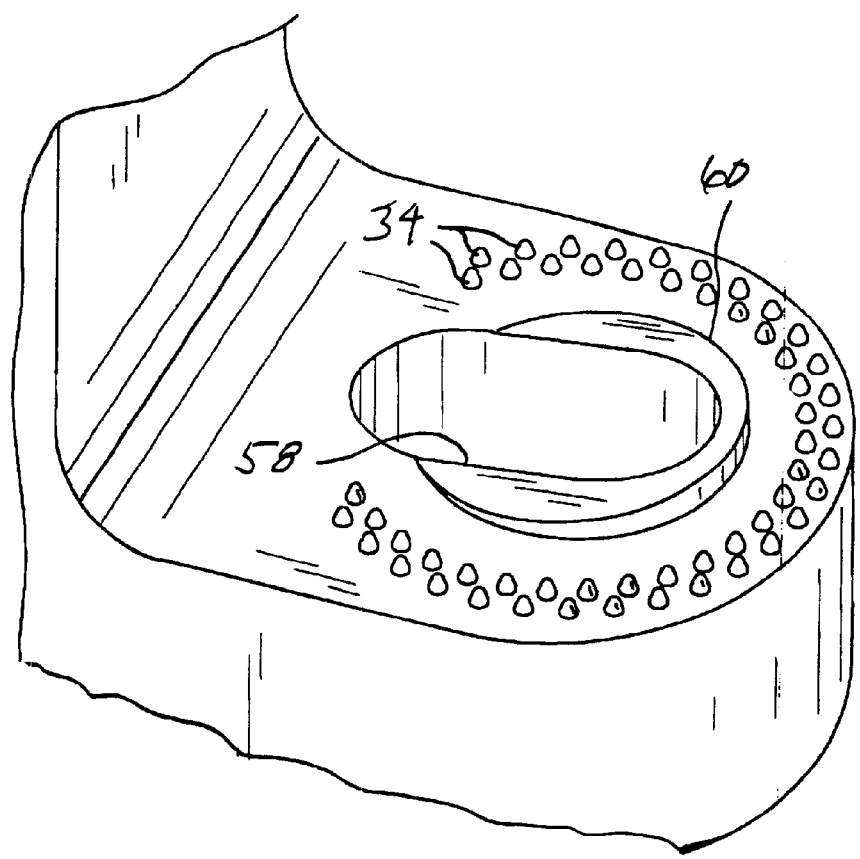
FIG. 11 is a perspective view of the underarm surface of the joint of FIG. 10B.

The basic design taught in the previous example also applies to the splayed design with a single exception. Since the bolt passes through a "slot" instead of a round hole, the integral dowel shape must be changed. This is in the form of a "horseshoe" shape 60, as shown in FIG. 11. This shape locates into a counterbore at the end of the slot and ensures precise relocation of the teeth into their respective indentations when the cap is refitted after crankshaft installation. To accommodate the inclined angle of the bolt, the counterbore angle will need to match this when being machined. The integral dowel 60 may taper in height as illustrated, or not, or taper in the opposite direction.

We claim:

1. A powder metal main bearing cap, comprising a central bearing bore portion with at least one bolt hole through said cap on each side of said bore portion, each said bolt hole extending from a free surface to an adjoining surface of said bearing cap, said adjoining surface adapted to face a surface of a cylinder block against which said main bearing cap is bolted, wherein an integral dowel projects from said adjoining face and at least partially surrounds said bolt hole, and wherein an array of teeth at least partially surround said integral dowel.

2. A powder metal main bearing cap as in claim 1, wherein the main bearing cap is fitted to an aluminum alloy cylinder block.

3. A powder metal main bearing cap as in claim 1, wherein the main bearing cap is fitted to a cast iron cylinder block.

4. A powder metal main bearing cap as in claim 1, wherein said teeth project from a flat surface of said adjoining face which at least partially surrounds said integral dowel.

5. A powder metal main bearing cap as in claim 4, wherein said teeth are cone shaped.

6. A powder metal main bearing cap as in claim 1, wherein each said bolt hole is an elongated slot which intersects a bolt head supporting face at an oblique angle such that a headed bolt with an axis at right angles to said face can be installed and tightened to provide a fastened joint between said main bearing cap and the corresponding cylinder block of an internal combustion engine.

* * * * *